(12) United States Patent
Chang

(10) Patent No.: US 7,654,719 B2
(45) Date of Patent: *Feb. 2, 2010

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 164 days.

This patent is subject to a terminal disclaimer.

(21) Appl. No.: 11/874,920

(22) Filed: Oct. 19, 2007

(65) Prior Publication Data

US 2009/0027893 A1 Jan. 29, 2009

(30) Foreign Application Priority Data

Jul. 23, 2007 (CN) .......................... 2007 1 0201151

(51) Int. Cl.
 *F21V 7/04* (2006.01)
(52) U.S. Cl. .................... 362/606; 362/97.2; 362/337; 362/626
(58) Field of Classification Search ............... 362/97.2, 362/97.3, 330, 335, 337, 606, 626, 625
See application file for complete search history.

(56) References Cited

U.S. PATENT DOCUMENTS

| 5,839,823 | A  | * | 11/1998 | Hou et al. .................... 362/327 |
| 6,425,673 | B1 | * | 7/2002  | Suga et al. ................... 362/613 |
| 6,700,716 | B2 | * | 3/2004  | Sejkora ....................... 359/834 |
| 6,964,497 | B2 | * | 11/2005 | Greiner ....................... 362/241 |
| 7,048,428 | B2 | * | 5/2006  | Tahara et al. ................. 362/626 |
| 7,422,357 | B1 | * | 9/2008  | Chang ......................... 362/602 |

* cited by examiner

*Primary Examiner*—Ali Alavi
(74) *Attorney, Agent, or Firm*—Frank R. Niranjan

(57) ABSTRACT

An exemplary optical plate includes at least one transparent plate unit and a diffusion layer. The transparent plate unit includes a light output surface, a bottom surface, a plurality of elongated V-shaped protrusions, and a lamp-receiving portion. The bottom surface is opposite to the light output surface. The elongated V-shaped protrusions are formed at the bottom surface. The lamp-receiving portion is defined in the bottom surface. The diffusion layer is formed on the light output surface of the transparent plate unit. A backlight module using the present optical plate is also provided.

15 Claims, 10 Drawing Sheets

OPTICAL PLATE AND BACKLIGHT MODULE USING THE SAME

CROSS-REFERENCE TO RELATED APPLICATIONS

This application is related to twenty two co-pending U.S. patent applications, which are: applications Ser. Nos. 11/835,425, 11/835,426, 11/835,427, 11/835,428, 11/835,429, 11/835,430, and 11/835,431, filed on Aug. 8, 2007, and all entitled "OPTICAL PLATE AND BACKLIGHT MODULE USING THE SAME", application Ser. No. 11/836,799 filed on August 10, and entitled "OPTICAL PLATE AND BACKLIGHT MODULE USING THE SAME", application Ser. No. 11/842,170, filed on Aug. 21, 2007, and entitled "OPTICAL PLATE AND BACKLIGHT MODULE USING THE SAME", applications Ser. Nos. 11/843,669 and 11/843,670, filed on Aug. 23, 2007, and both entitled "OPTICAL PLATE AND BACKLIGHT MODULE USING THE SAME", application Ser. No. 11/845,100, filed on Aug. 27, 2007, and entitled "OPTICAL PLATE AND BACKLIGHT MODULE USING THE SAME", applications Ser. Nos. 11/845,790, 11/845,792, 11/845,793, and 11/845,794, filed on Aug. 28, 2007, all entitled "OPTICAL PLATE AND BACKLIGHT MODULE USING THE SAME", applications Ser. Nos. 11/850,040 and 11/850,041, filed on Sep. 5, 2007, both entitled "OPTICAL PLATE AND BACKLIGHT MODULE USING THE SAME", applications Ser. Nos. 11/861,310 and 11/861,311, filed on Sep. 26, 2007, both entitled "OPTICAL PLATE AND BACKLIGHT MODULE USING THE SAME", application Ser. No. 11/862,203, filed on Sep. 27, 2007, and entitled "OPTICAL PLATE AND BACKLIGHT MODULE USING THE SAME", and application Ser. No. 11/874,918, filed on Oct. 19, 2007, and entitled "OPTICAL PLATE AND BACKLIGHT MODULE USING THE SAME". In all these co-pending applications excepting application Ser. No. 11/845,790, the inventor is Shao-Han Chang. In application Ser. No. 11/845,790, the inventor is Shao-Han Chang and Fen Chen. All of the co-pending applications have the same assignee as the present application. The disclosures of the above identified applications are incorporated herein by reference.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

In a liquid crystal display device, liquid crystal is a substance that does not itself produce light. Instead, the liquid crystal relies on light received from a light source, in order for the liquid crystal to display data images. In the case of a typical liquid crystal display device, a backlight module powered by electricity supplies the needed light.

FIG. 10 represents a typical direct type backlight module 100. The backlight module 100 includes a housing 101, a light reflective plate 102, a light diffusion plate 103, a prism sheet 104, and a plurality of light emitting diode 105 (hereinafter called LED). The housing 101 includes a rectangular base 1011 and four sidewalls 1013 extending around a periphery of the base 1011. The base 1011 and the four sidewalls 1013 cooperatively define a chamber 107. Each LED 105 includes a base portion 1053 and a light-emitting portion 1051 disposed on the base portion 1053. The LEDs 105 are electrically connected to a printed circuit board 107, and the printed circuit board 107 is fixed to the base 1011 of the housing 101. The light reflective plate 102 is disposed on the LEDs 105 in the chamber 107. The light reflective plate 102 defines a plurality of through holes (not labeled) that allows the light-emitting portions 1051 of the LED 105 to pass through and to emit light to be transmitted to the light diffusion plate 103. The light diffusion plate 103 is stacked on the prism sheet 104 in the chamber 107. Light emitted from the LEDs 105 is substantially reflected by the light reflective sheet 102 to the light diffusion plate, diffused uniformly in the light diffusion plate 103, and exit the prism sheet 104 as surface light.

Generally, a plurality of dark areas may occur because of the reduced intensity of light between adjacent LEDs 105. In the backlight module 100, each LED 105 further includes a reflective sheet 106 disposed on the top of the light-emitting portion 1051, configured for decreasing the brightness of a portion of the backlight module 100 above the LED 105. However, the brightness of the backlight module 100 is still unduly non-uniform.

What is needed, therefore, is a new optical plate and a backlight module using the optical plate that can overcome the above-mentioned shortcomings.

SUMMARY

An optical plate according to a preferred embodiment includes at least one transparent plate unit and a diffusion layer. The transparent plate unit includes a light output surface, a bottom surface, a plurality of elongated V-shaped protrusions, and a lamp-receiving portion. The bottom surface is opposite to the light output surface. The elongated V-shaped protrusions are formed at the bottom surface. The lamp-receiving portion is defined in the bottom surface. The diffusion layer is formed on the light output surface of the transparent plate unit.

A backlight module according to a preferred embodiment includes a housing, a point light source, a reflective member and an optical plate. The housing includes a base and a plurality of sidewalls extending around a periphery of the base, the base and the sidewalls cooperatively forming an opening. The point light source is disposed on the base, each point light source having a light-emitting portion. The reflective member is positioned above the top of the light-emitting portion. The same optical plate as described in the previous paragraph is employed in this embodiment. The light-emitting portion of the point light source is inserted in the lamp-receiving portion of the optical plate correspondingly. The diffusion layer of the optical plate faces the opening of the housing.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
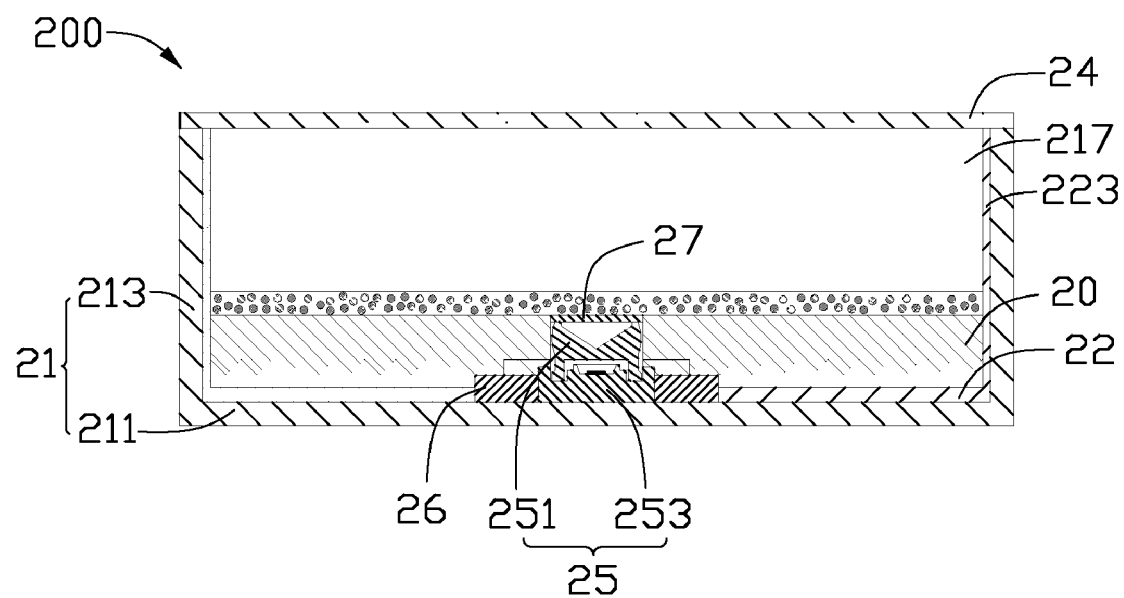
FIG. 1 is a side cross-sectional view of a backlight module using an optical plate according to a first preferred embodiment of the present invention.

Referring to FIG. 1, a backlight module 200 in accordance with a first preferred embodiment is shown. The backlight module 200 includes an optical plate 20, a housing 21, a light reflective plate 22, a transparent plate 24, an LED 25, and a reflective member 27. The housing 21 includes a rectangular base 211 and four sidewalls 213 extending around a periphery of the base 211 correspondingly. The base 211 and the sidewalls 213 cooperatively form an opening 217. The optical plate 20, the light reflective plate 22, the LED 25 and the reflective member 27 are received in the housing 21. The transparent plate 24 is positioned on the housing 21 over the opening 217.

Figure 2:
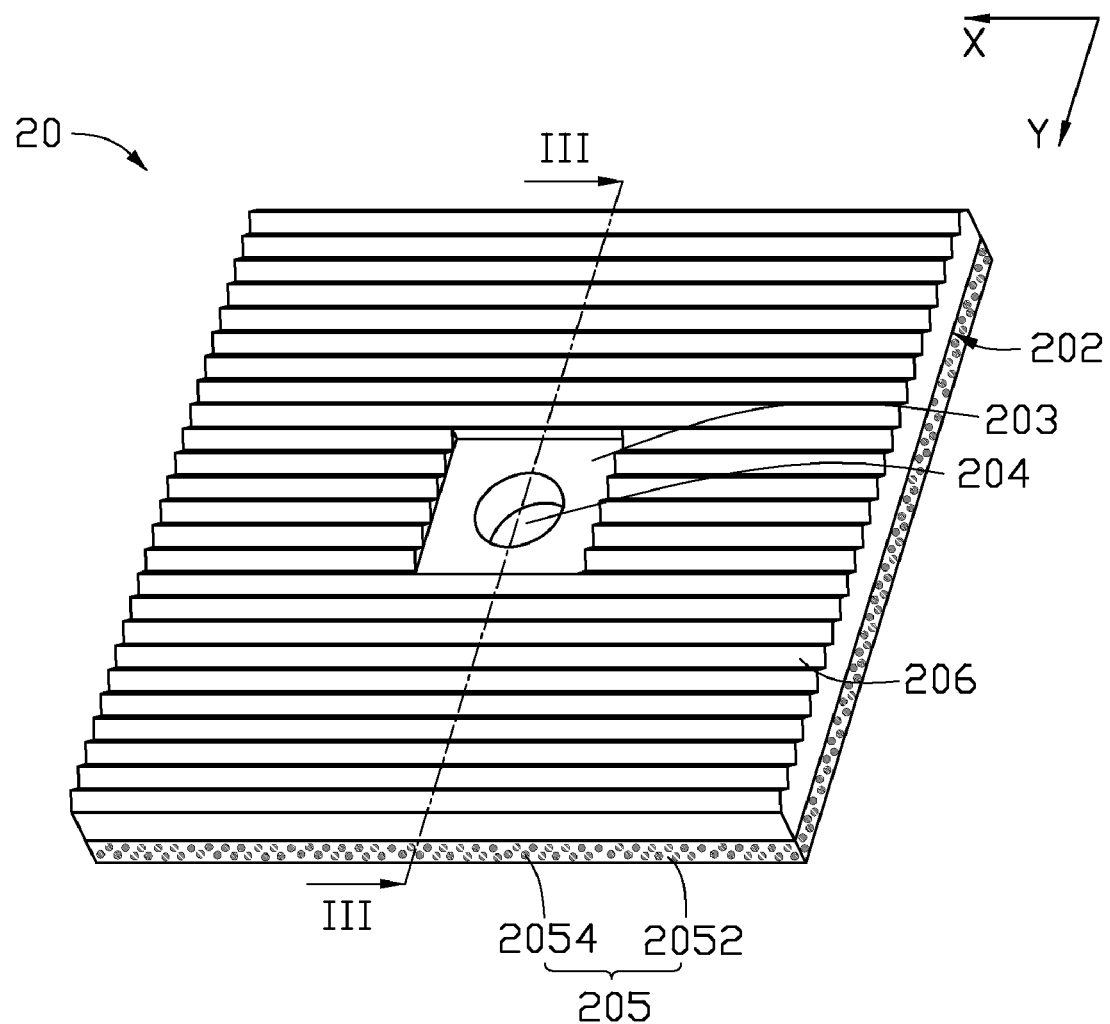
FIG. 2 is an isometric view of the optical plate of FIG. 1.
Figure 3:
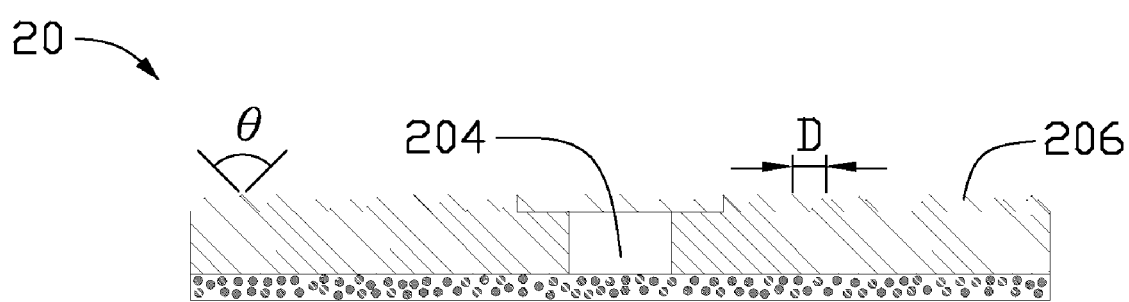
FIG. 3 is a side cross-sectional view of the optical plate of FIG. 2, taken along line III-III thereof.

Referring to FIGS. 2 and 3, the optical plate 20 includes a light output surface 202, a bottom surface 203, a diffusion layer 205, and plurality of elongated V-shaped protrusions 206. The bottom surface 203 and the light output surface 202 are on opposite sides of the optical plate 20. Each elongated V-shaped protrusion 206 extends from the bottom surface 203. The diffusion layer 205 is formed on the light output surface 202. The diffusion layer 205 has a uniform thickness and entirely covers the light output surface 202. The optical plate 20 further includes a lamp-receiving portion 204 defined in a center of the bottom surface 203. In this embodiment, the lamp-receiving portion 204 is a through hole communicating with the light output surface 202 and the bottom surface 203.

The optical plate 20 can be made from transparent material selected from the group consisting of polycarbonate (PC), polymethyl methacrylate (PMMA), polystyrene (PS), copolymer of methylmethacrylate and styrene (MS), and any suitable combination thereof. The diffusion layer 205 includes transparent resin matrix material 2052, and diffusion particles 2054 uniformly dispersed in the transparent resin matrix material 2052. The diffusion layer 205 is manufactured by solidifying an ink layer that is coated on the light output surface 202. The ink layer includes a varnish and a plurality of diffusion particles 2054 dispersed in the varnish. The varnish is preferably acrylic varnish. The transparent resin matrix material 2052 is made of acrylic from the varnish. The diffusion particle 2044 is selected from a group consisting of glass beads, silicon dioxide ($SiO_2$) particles, PMMA particles, and any combination thereof.

Again referring to FIGS. 2 and 3, in this embodiment, each elongated V-shaped protrusion 206 extends along a direction parallel to an X-axis direction (parallel to one of the edges of the optical plate 20). The elongated V-shaped protrusions 206 are aligned parrallely to each other and adjacent elongated V-shaped protrusions 206 connect to each other. The elongated V-shaped protrusions 206 extend throughout the lamp-receiving portion 204 except for an area substantially square. A pitch D between adjacent elongated V-shaped protrusions 206 is configured to be in a range from about 0.025 millimeters to about 2 millimeters. A vertex angle θ of each of the elongated V-shaped protrusions 206 is configured to be in a range from about 60 degrees to about 120 degrees.

Again referring to FIG. 1, in this embodiment, the LED 25 includes a base portion 253, and a light-emitting portion 251 disposed on the base portion 253. The LED 25 is electrically connected to a printed circuit board 26 that is fixed to the base 211 of the housing 21. In this embodiment, the reflective member 27 is a reflective plate disposed on the top of the light-emitting portion 251. The reflective member 27 and the LED 25 are inserted into the lamp-receiving portion 204 together. In alternative embodiments, the reflective member 27 can be a light reflective film deposited on the top of the light-emitting portion 251, or the reflective member 27 can be a reflective plate disposed on the diffusion layer 205 above the LED 25. The light reflective plate 22 defines a through hole (not labeled). The light reflective plate 22 is disposed under the bottom surface 203 of the optical plate 20 and the LED 25 passes through the light reflective plate 22 via the through hole.

In use, light emitted from the light-emitting portion 251 of the LED 25 enters the optical plate 20 via an inner surface of the lamp-receiving portion 204. A significant amount of light transmits to the optical plate 20. An amount of light is reflected at the elongated V-shaped protrusions 206 and/or the light reflective plate 22 before exiting from the light output surface 202. Accordingly, a light energy utilization rate of the backlight module 200 is increased. In addition, the light from the light output surface 202 can be further diffused in the diffusion layer 205 for improving the uniformity of light outputted.

It should be pointed out that, the light reflective plate 22 can be omitted. In an alternative embodiment, a high reflectivity film can be deposited on inner surfaces of the base 211 and the sidewalls 213 of the housing 21. In other alternative embodiments, the housing 21 is made of metal materials and having high reflectivity inner surfaces.

It is to be understood that, in order to improve the brightness of the backlight module 200 at a specific range of viewing angles, the backlight module 200 can further include a prism sheet (not shown) disposed on the transparent plate 24. In addition, in order to improve light energy utilization rate of the backlight module 200, the light reflective plate 22 can further include four reflective sidewalls 223 extending around a periphery thereof. The sidewalls 223 are in contact with the corresponding sidewalls 213 of the housing 21. Furthermore, the elongated V-shaped protrusions 206 do not have to extend parallely to a corresponding edge, but may also extend obliquely with respect to the corresponding edge. The elongated V-shaped protrusions 206 may also further extend obliquely with respect to each other.

Figure 4:
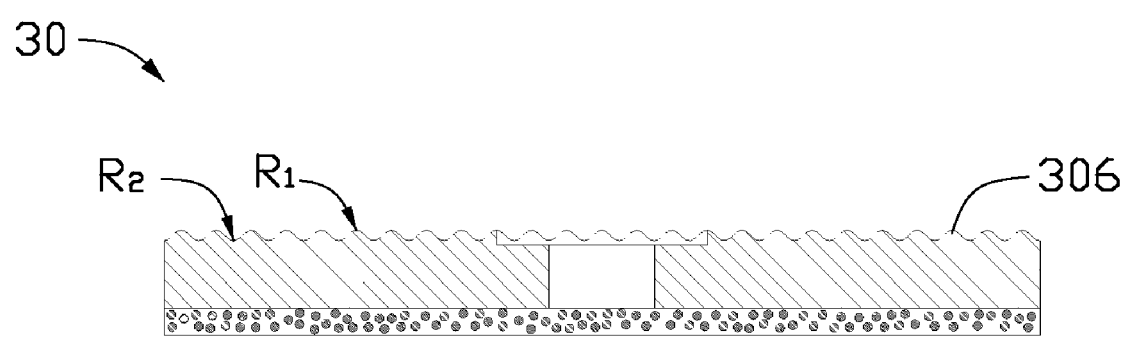
FIG. 4 is a side cross-sectional view of an optical plate according to a second preferred embodiment of the present invention.

Referring to FIG. 4, an optical plate 30 in accordance with a second preferred embodiment is shown. The optical plate 30 is similar in principle to the optical plate 20, except that either a top edge of each elongated V-shaped protrusion 306 or a bottom edge defined by the boundary formed by the bases of two adjacent elongated V-shaped protrusion 306 are rounded. The curvature of this rounded surface is defined by a sphere of radius R. The radius $R_1$ of the rounded top edge and a radius $R_2$ of the rounded bottom edge is equal to or less than 1.1 millimeters and greater than zero. It is to be understood that, one or more of the vertex angles and the base angles, can also be rounded.

Figure 5:
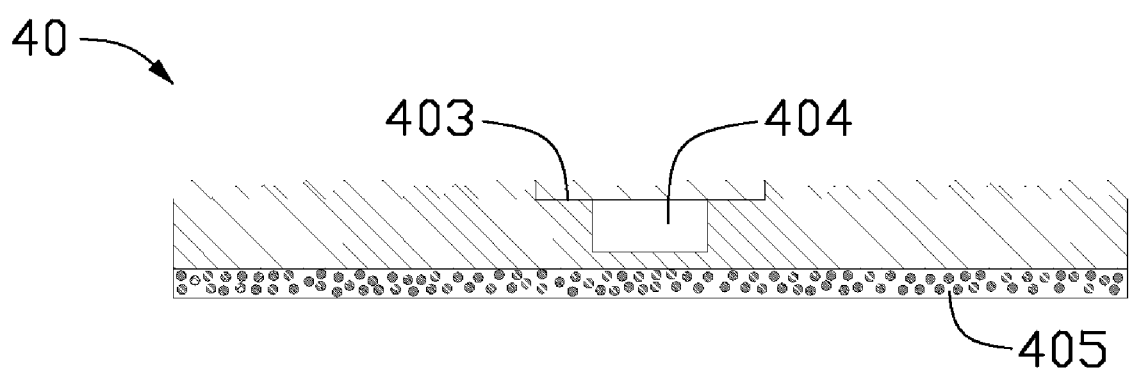
FIG. 5 is a side cross-sectional view of an optical plate according to a third preferred embodiment of the present invention.

Referring to FIG. 5, an optical plate 40 in accordance with a third preferred embodiment is shown. The optical plate 40 is similar in principle to the optical plate 20 of the first embodiment (FIG. 2). However, the lamp-receiving portion 404 of the optical plate 40 is a blind hole. It should be pointed out that, a LED (not shown) without a reflective member can be mounted into the lamp-receiving portion 404 of the optical plate 40 to form a backlight module. Alternatively, a reflective member of the LED can be also positioned on a center of the diffusion plate 405 of the optical plate 40 above the lamp-receiving portion 404.

Figure 6:
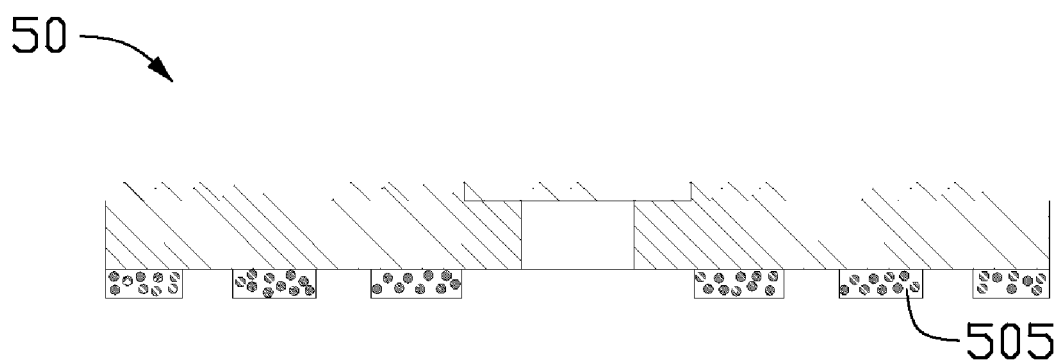
FIG. 6 is a side cross-sectional view of an optical plate according to a fourth preferred embodiment of the present invention.

Referring to FIG. 6, an optical plate 50 in accordance with a fourth preferred embodiment is shown. The optical plate 50 is similar in principle to the optical plate 20 (FIG. 2). However, a diffusion layer 505 of the optical plate 50 is a diffusion dot pattern that includes a plurality of dots arranged apart in a random manner.

Figure 7:
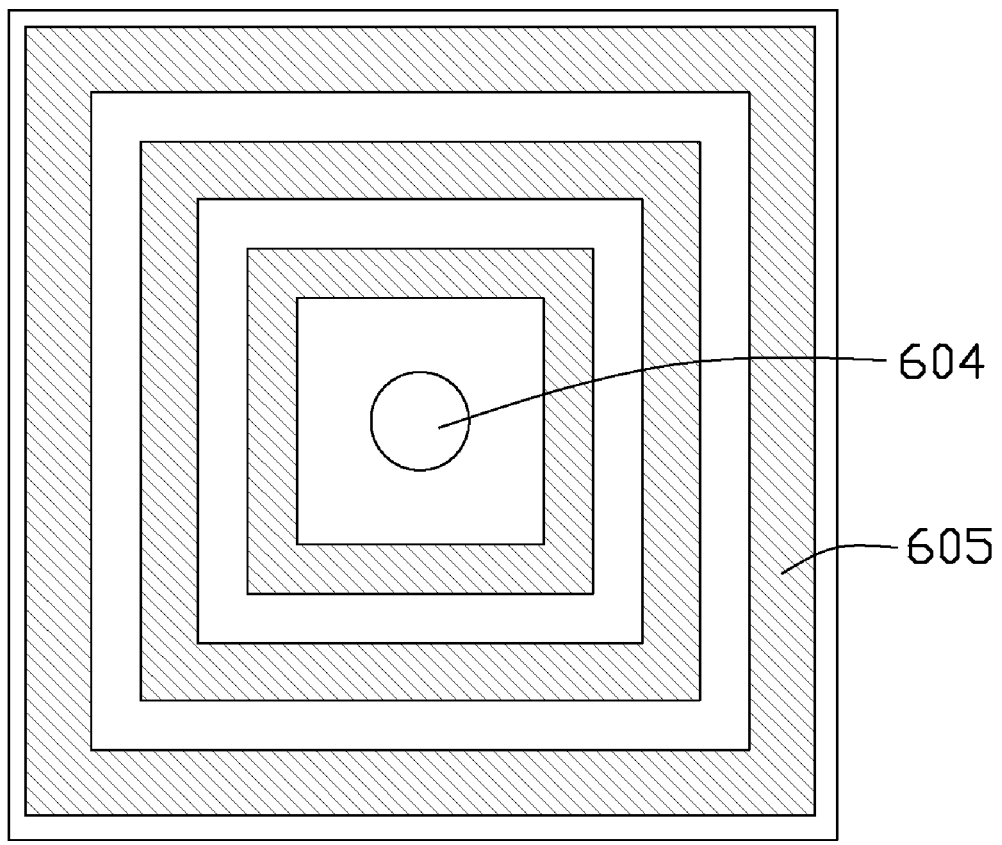
FIGS. 7 through 9 are top plan views of distributions of diffusion layers of the optical plate of the present invention.
Figure 8:
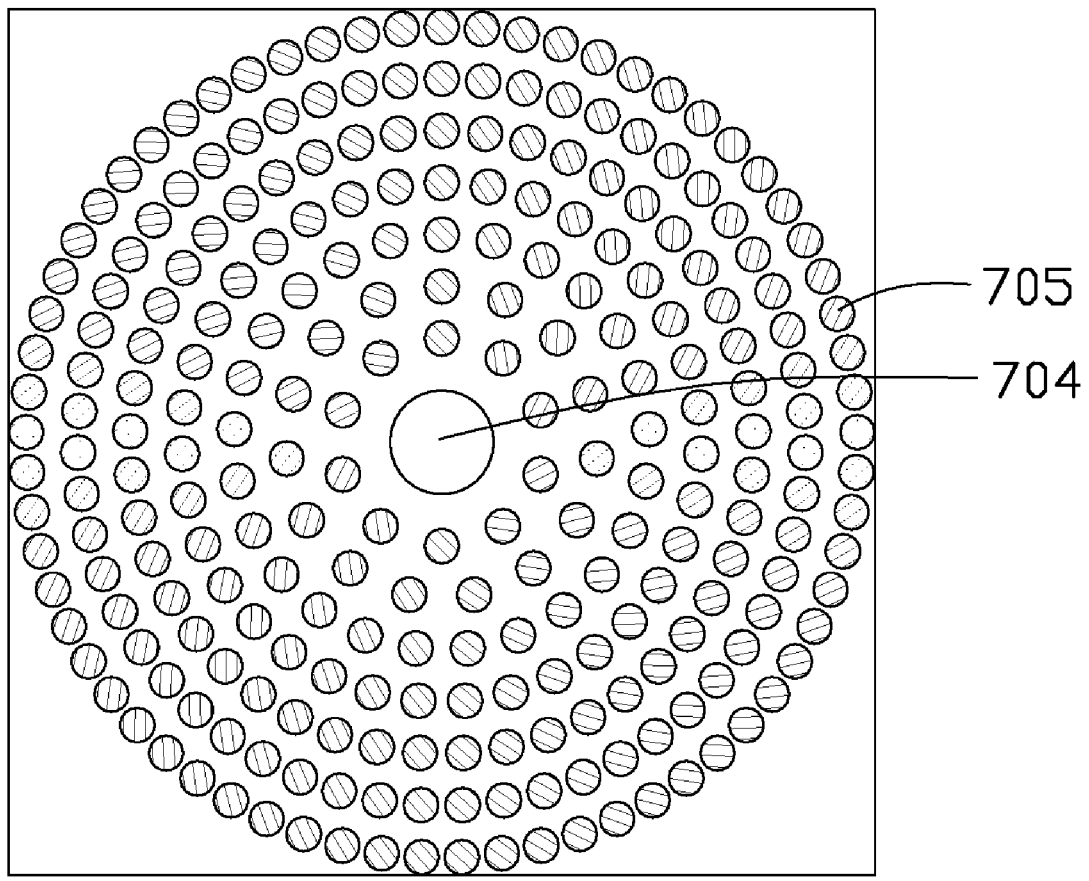
Figure 9:
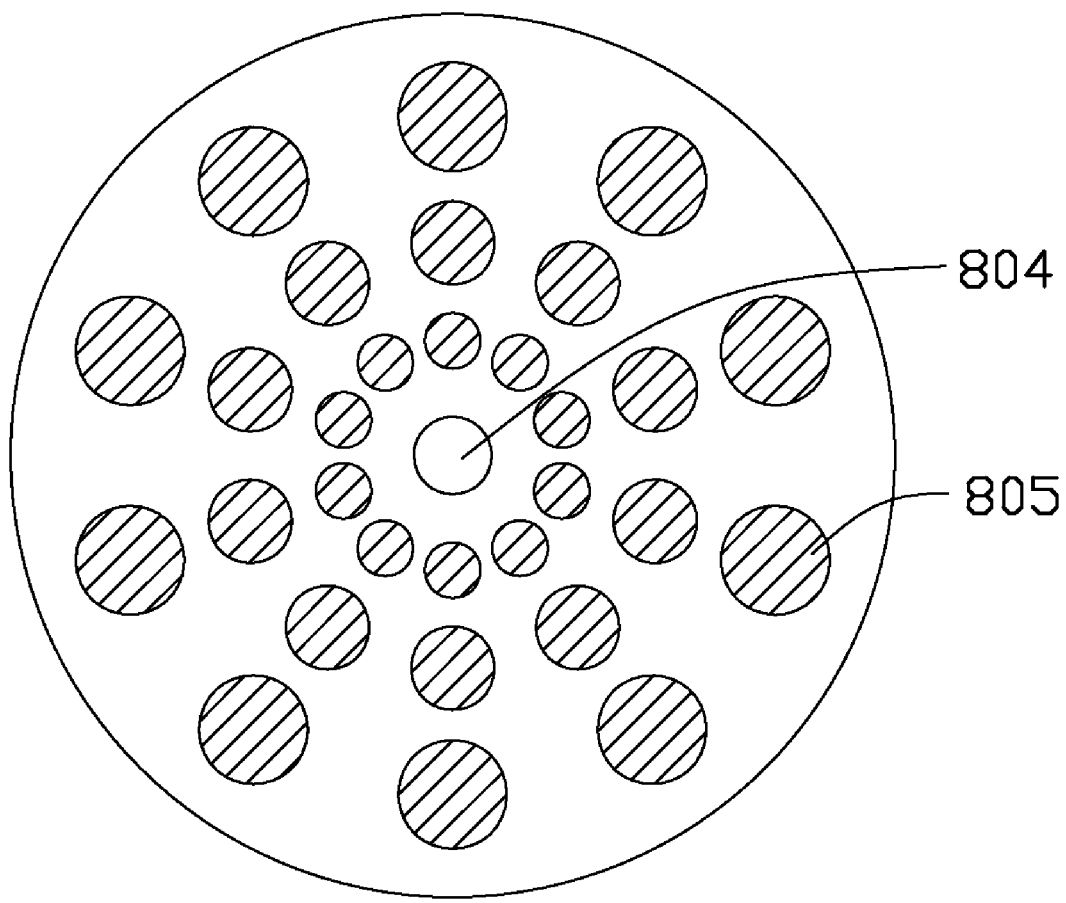
Figure 10:
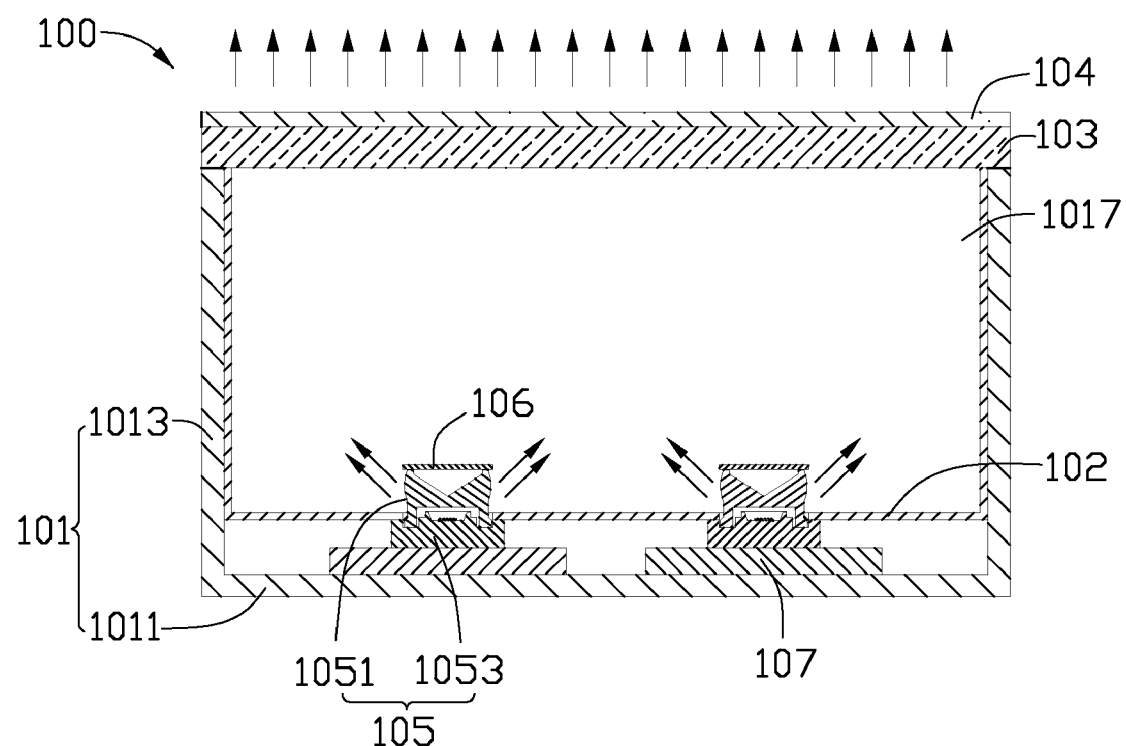
FIG. 10 is a side cross-sectional view of a conventional backlight module.

In the other alternative embodiments, the diffusion layer 304 of optical plate 30 can take other forms of diffusion dot patterns or diffusion ring patterns as shown in FIGS. 7 through 9.

Referring to FIG. 7, a distribution design of a diffusion layer is described below. A diffusion layer 605 is composed of four (or more) substantially square walls arranged apart. Centers of the four square walls of the diffusion layer 605 are collinear, and are aligned at a portion of a lamp-receiving portion 604. Furthermore, a width of the square walls increases along a direction away from the lamp-receiving portion 604.

Referring to FIG. 8, another distribution design of a diffusion layer is described below. A diffusion layer 705 is composed of a plurality of circular dots. The circular dots are substantially identical to each other. The circular dots are arranged separately along a plurality of imaginary circles that have a same center. The center of the imaginary circles is also a center of a lamp-receiving portion 704. The sizes of circular dots of each imaginary circle increase along a direction away from the lamp-receiving portion 704.

Referring to FIG. 9, a still another distribution design of a diffusion layer is described below. A diffusion layer 805 is composed of a plurality of circular dots. The circular dots are arranged radially from a lamp-receiving portion 804. Sizes of the circular dots at different distance away from the lamp-receiving portion 804 are different. The sizes of the circular dots increase as a distance of the circular dots from the lamp-receiving portion 804.

In a backlight module using a plurality of optical plates combined side by side, a plurality of red, green, and blue colored LEDs can be inserted into the lamp-receiving portions of the combined optical plates correspondingly, such that a mixed white surface light can be obtained. It is to be understood that other kinds of point light source, such as field emission lamps and so on, can replace the LEDs in above embodiments.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate unit having:
   a light output surface,
   a bottom surface opposite to the light output surface,
   a plurality of elongated V-shaped protrusions formed at the bottom surface, and
   at least one lamp-receiving portion defined in the bottom surface; and
   a diffusion layer formed on the light output surface, wherein the diffusion layer is composed of a plurality of circular dots; the circular dots are identical to each other; the circular dots are arranged separately along a plurality of imaginary circles that have a same center; the center of the imaginary circles is aligned at a center of the lamp-receiving portion; and sizes of the circular dots of each imaginary circle increase along a direction away from the lamp-receiving portion.

2. The optical plate according to claim 1, wherein the lamp-receiving portion is defined in a center of the bottom surface.

3. The optical plate according to claim 1, wherein the diffusion layer comprises transparent resin matrix material, and diffusion particles dispersed in the transparent resin matrix material.

4. The optical plate according to claim 3, wherein the diffusion layer comprises a transparent resin matrix material and a plurality of diffusion particle dispersed in the transparent resin matrix material.

5. The optical plate according to claim 3, wherein the diffusion particle is selected from a group consisting of glass beads, silicon dioxide particles, PMMA particles, and any combination thereof.

6. The optical plate according to claim 1, wherein each elongated V-shaped protrusion extends along a direction parallel to one of edges of the optical plate.

7. The optical plate according to claim 1, wherein the lamp-receiving portion is selected from one of blind hole and through hole communicating between the light output surface and the bottom surface.

8. The optical plate according to claim 1, wherein the diffusion layer has a uniform thickness and entirely covers the light output surface.

9. A backlight module comprising:
   a housing having a base and a plurality of sidewalls extending around a periphery of the base, the base and the sidewalls cooperatively forming an opening;
   at least one point light source disposed on the base, each point light source having a light-emitting portion;
   at least one reflective member is positioned above the top of the light-emitting portion; and
   an optical plate positioned in the housing, the optical plate including at least one transparent plate unit having:
   a light output surface,
   a bottom surface opposite to the light output surface,
   a plurality of elongated V-shaped protrusions formed at the bottom surface, and
   at least one lamp-receiving portion defined in the bottom surface; and a diffusion layer formed on the light output surface, wherein the light-emitting portion of the at least one point light source is inserted in the lamp-receiving portion correspondingly, the diffusion layer facing the opening of the housing; the diffusion layer is composed of a plurality of circular dots; the circular dots are identical to each other; the circular dots are arranged separately along a plurality of imaginary circles that have a same center; the center of the imaginary circles is aligned at a center of the lamp-receiving portion; and sizes of the circular dots of each imaginary circle increase along a direction away from the lamp-receiving portion.

10. The backlight module according to claim 9, further comprising a light reflective plate defining a through hole therein, the light reflective plate being disposed underneath the bottom surface of the optical plate, and the point light source passing through the light reflective plate via the through hole.

11. The backlight module according to claim 10, wherein the light reflective plate further comprises a plurality of reflective sidewalls extending around a periphery thereof and the reflective sidewalls are in contact with the corresponding sidewalls of the housing.

12. The backlight module according to claim 9, wherein the housing is made of metal materials, and has high reflectivity inner surfaces.

13. The backlight module according to claim 9, further comprising a high reflectivity film deposited on inner surfaces of the base and the sidewalls of the housing.

14. The backlight module according to claim 9, wherein the lamp-receiving portion is selected from one of blind hole and through hole communicating between the light output surface and the bottom surface.

15. An optical plate comprising:
at least one transparent plate unit having:
a light output surface,
a bottom surface opposite to the light output surface,
a plurality of elongated V-shaped protrusions formed at the bottom surface, and
at least one lamp-receiving portion defined in the bottom surface; and
a diffusion layer formed on the light output surface, wherein the diffusion layer is composed of a plurality of circular dots; the circular dots are arranged radially from the lamp-receiving portion; sizes of the circular dots at different distance away from the lamp-receiving portion are different; and sizes of circular dots increase as a distance of the circular dots from the lamp-receiving portion.

\* \* \* \* \*